United States Patent
Simonis et al.

(10) Patent No.: US 11,053,686 B2
(45) Date of Patent: Jul. 6, 2021

(54) COVER LAMINATE OR COVER LAYER SYSTEM

(71) Applicant: Icopal Danmark ApS, Herlev (DK)

(72) Inventors: Udo Simonis, Ronneburg (DE); Johannes Glück, Hammelburg (DE)

(73) Assignee: ICOPAL DANMARK APS, Herlev (DK)

( * ) Notice: Subject to any disclaimer, the term of this patent is extended or adjusted under 35 U.S.C. 154(b) by 178 days.

(21) Appl. No.: 15/493,226

(22) Filed: Apr. 21, 2017

(65) Prior Publication Data

US 2017/0306628 A1  Oct. 26, 2017

(30) Foreign Application Priority Data

Apr. 21, 2016  (DE) ..................... 10 2016 107 418.7

(51) Int. Cl.
  *E04D 5/10* (2006.01)
  *B32B 27/30* (2006.01)
  (Continued)

(52) U.S. Cl.
  CPC ............. *E04D 5/10* (2013.01); *B32B 25/08* (2013.01); *B32B 27/08* (2013.01); *B32B 27/12* (2013.01); *B32B 27/22* (2013.01); *B32B 27/285* (2013.01); *B32B 27/302* (2013.01); *B32B 27/304* (2013.01); *B32B 27/308* (2013.01);
  (Continued)

(58) Field of Classification Search
  CPC ....... B32B 27/08; B32B 27/22; B32B 27/302; B32B 27/304; B32B 2419/06; B32B 2581/00
  See application file for complete search history.

(56) References Cited

U.S. PATENT DOCUMENTS 4,442,148 A  4/1984  Stierli
5,824,401 A  10/1998  Jenkins et al.
(Continued)

FOREIGN PATENT DOCUMENTS

DE  35 03 809 A1  8/1986
DE  44 03 101 A1  9/1994
(Continued)

OTHER PUBLICATIONS

Non-English German Office Action dated Feb. 13, 2017 for German Application No. 10 2016 107 418.7.
(Continued)

*Primary Examiner* — Jeremy R Pierce
(74) *Attorney, Agent, or Firm* — Ladas & Parry LLP; Malcolm J. MacDonald

(57) ABSTRACT

The invention relates to a cover laminate such as a roof laminate or cover layer system (10) comprising at least a first layer (14), which extends on the cover side, in the form of a migration-inhibiting barrier layer or barrier film with respect to bitumen, plasticizer and/or EPS, and a second layer (12), which extends on the side away from the cover, in the form of a first nonwoven, wherein the first layer is connected to the second layer either by means of a reactive plasticizer-resistant adhesive (16), or, in the case of formation of the first layer as a thermoplastic hot-melt adhesive film, by means of said film.

18 Claims, 2 Drawing Sheets

(51) Int. Cl.
- *B32B 27/22* (2006.01)
- *B32B 27/08* (2006.01)
- *C09J 175/04* (2006.01)
- *B32B 27/32* (2006.01)
- *B32B 25/08* (2006.01)
- *B32B 27/28* (2006.01)
- *B32B 27/12* (2006.01)
- *B32B 27/36* (2006.01)
- *B32B 27/34* (2006.01)

(52) U.S. Cl.
CPC ............ *B32B 27/32* (2013.01); *B32B 27/34* (2013.01); *B32B 27/36* (2013.01); *B32B 27/365* (2013.01); *C09J 175/04* (2013.01); *B32B 2262/0253* (2013.01); *B32B 2262/0261* (2013.01); *B32B 2262/0276* (2013.01); *B32B 2262/0284* (2013.01); *B32B 2262/0292* (2013.01); *B32B 2274/00* (2013.01); *B32B 2307/72* (2013.01); *B32B 2307/7265* (2013.01); *B32B 2307/732* (2013.01); *B32B 2419/00* (2013.01); *B32B 2419/06* (2013.01); *B32B 2581/00* (2013.01)

(56) References Cited

U.S. PATENT DOCUMENTS

| | | |
|---|---|---|
| 6,194,049 B1 | 2/2001 | Bindschedler-Galli et al. |
| 6,465,104 B1* | 10/2002 | Krebs .................... C08G 18/12 428/423.1 |
| 7,618,700 B2 | 11/2009 | Furst |
| 7,923,389 B2 | 4/2011 | Leucht et al. |
| 2003/0209305 A1* | 11/2003 | Smith .................... E04D 12/002 428/411.1 |
| 2004/0023585 A1* | 2/2004 | Carroll .................... B32B 27/12 442/381 |
| 2007/0077838 A1* | 4/2007 | Binkley .................... B32B 7/02 442/382 |
| 2008/0026663 A1* | 1/2008 | Zhang .................... B32B 11/04 442/398 |
| 2008/0032114 A1* | 2/2008 | Squires .................... B32B 27/12 428/308.4 |
| 2012/0167509 A1* | 7/2012 | Brandt .................... B32B 27/40 52/309.13 |

FOREIGN PATENT DOCUMENTS

| | | |
|---|---|---|
| DE | 103 34 714 A1 | 4/2004 |
| DE | 102 61 213 A1 | 7/2004 |
| EP | 0 704 297 A1 | 4/1996 |
| EP | 1 407 878 A1 | 4/2004 |
| EP | 1 500 493 A1 | 1/2005 |
| EP | 1 741 551 A1 | 1/2007 |
| GB | 2 138 357 A | 10/1984 |

OTHER PUBLICATIONS

Espacenet English abstract of DE 44 03 101 A1.
Espacenet English abstract of EP 1 500 493 A1.
Espacenet English abstract of DE 103 34 714 A1.
Espacenet English abstract of DE 35 03 809 A1.
Espacenet English abstract of EP 1 741 551 A1.
Espacenet English abstract of EP 1 407 878 A1.
"Bauschäden infolge Änderung mechanischer Eigenschaften von PVC-Dachbahnen aufgrund eines Weichmacherverlustes", Forschungsarbeit (Jun. 1986), ausgefiihrt in der Bundesanstalt fiir Materialpriifung, Berlin).
L. Glück, 2003 ,"Einwirkung von Bitumen auf Kunststoff-Dach- und Dichtungsbahnen".

* cited by examiner

COVER LAMINATE OR COVER LAYER SYSTEM

SUMMARY BACKGROUND OF THE INVENTION

The invention relates to a cover laminate or cover layer system. The invention further relates to the use of a cover laminate such as a roof laminate or a cover layer system.

Another subject matter of the invention is a method for producing a cover laminate or layer system.

In order to protect, in particular, surfaces of a structure from weather effects against contact media, sealing sheets made of bitumen, polymer bitumen, adhesive plastic (primarily thermoplastics) or elastomers are used.

In the renovation of old surfaces sealed with bitumen sheets (flat roof, civil engineering), sheets that are not compatible with bitumen cannot be laid directly on the old bitumen seal to be renovated, since interactions occur between the plastic sheet (often PVC-P-NB) and the bitumen, in such a manner that plasticizers (monomer plasticizers such as DINP, DIDP or linear plasticizers) or also other liquid components such as ESBO or liquid thermostabilizers migrate into the bitumen layer. Moreover, direct laying on EPS (expanded polystyrene) used for insulation may also not be possible, since interactions between the roofing sheet and the insulation are also possible here, in the sense of migration of volatile or liquid components (such as plasticizers, for example).

Due to the migration of the plasticizer, the roofing sheet turns brittle, it loses its flexibility, its dimensional stability, i.e., it shrinks quite considerably due to the weight loss and becomes highly sensitive to mechanical stresses (literature reference: Weichmacherverlust, Bauschäden in Folge Änderung mechanischer Eigenschaften von PVC-Dachbahnen DDH 4/87, from page 34 on: Kurzbericht einer Forschungsarbeit (June 1986), carried out in the Federal Institute for Materials Testing, Berlin).

For architectural reasons and to keep heating of the roof surface as low as possible, light colored sheets have been used increasingly in the past years.

Although these sheets were classified as compatible with bitumen according to DIN EN 1548, discolorations of the surface occur during contact with bitumen.

These discolorations are due to bitumen oils (flux oils) or other contents that can migrate through the plastic sheet to the surface and, in particular, worsen the bonding behavior and the aging behavior.

In a paper by L. Glück from the year 2003 "Einwirkung von Bitumen auf Kunststoff-Dach-und Dichtungsbahnen," it was shown that polymer-softened PVC-p sheets are very resistant, but that in practice discoloration occurs. Other sheets based on EVA, CPE and FPO in contact with bitumen have a special feature, in particular the FPO-based sheets. These sheets absorb bitumen oils to a very high degree, but they also do not release them again after reconditioning. Due to the high absorption of the oils, the mechanical values are influenced. Swelling occurs. It should be assumed that the long-term adhesion is negatively affected.

Plastic roof and sealing sheets with a self-adhesive layer (based on PVC-P) have been marketed since 1991. As cold self-adhesive layer, a bitumen-rubber-resin compound is definitely still used today; however, self-adhesive layers based on other materials also exist, for example, based on acrylate, based on rubber such as SBR or also styrene copolymers such as SBS, SIS, SEBS or SEPS. Monomer-softened and consequently non-migration-stable formulations based on PVC-p cannot come in direct contact with the cold self-adhesive layer, since the above-mentioned interactions occur. Polymer-softened sheets have a lower volatility, due to the longer-chain plasticizers, but the plasticizers can be split into short-chain elements, due to aging, particularly due to hydrolysis.

Light colored bitumen-compatible sheets can also not be provided in a cold self-adhesive manner with such a composition, since the above-mentioned discolorations or other interactions occur (in FPO sheets, great weight increase due to absorption of the bitumen oils).

In order to avoid the dark or black color of bitumen sheets as visible surface, it is known to provide corresponding sheets with a cover layer that is impermeable to light and/or UV radiation and designed as colored (DE-A-44 03 101). However, it was found that the oils contained in the bitumen migrate to the surface of the covering layer, so that spotting occurs.

A multi-layered sheet can be obtained from EP-A-1 500 493. In order to prevent migration, it is provided that the multi-layered sheet comprises a non-metal barrier layer which extends between an outer polymer layer and a bitumen layer. Here, the non-metal barrier layer can be selected to be based on polymers selected from the group consisting of polyamide, ethylene vinyl alcohol, polyester and/or mixtures thereof. Moreover, in one layer reinforcing materials can be present. The reinforcement materials can be nonwovens, noncrimp fabrics, woven fabrics and/or combinations thereof.

From DE-A-103 34 714, a roofing sheet can be obtained, which comprises a fiber layer on the building side, which is provided with a metallization in order to provide shielding from electromagnetic radiation.

DE-A-35 03 809 relates to a sealing sheet which comprises an impregnated fiber layer in order to be able to homogeneously weld corresponding sealing sheets.

A film with a vapor-tight and fluid-impermeable intermediate layer is known from EP-A-0 704 297, in order to prevent oils from leaking from a bitumen sheet to the surface, which, unless prevented, would result in an undesirable discoloration.

A multi-layered roofing sheet is known from GB-A-2 138 357. One of these layers can be a nonwoven.

An intermediate layer consisting of a VLDPE, which can contain polyvinyl fluoride, is found in a multi-layered sheet according to U.S. Pat. No. 6,194,049. The corresponding intermediate layer is impermeable to vapor.

A multi-layered sheet according to U.S. Pat. No. 4,442,148 also comprises a vapor-proof barrier layer which does not necessarily have to be an intermediate layer.

Vapor-proof layers of a composite of films and bitumen are known from EP-A-1 407 878.

A roofing sheet according to EP-A-1 741 551 comprises a first layer, for example, consisting of a polymer, and a second layer which is migration-inhibiting with respect to bitumen and which is an impregnated fluorine plastic layer which is impregnated with a nonwoven plastic as migration-inhibiting means.

SUMMARY OF THE INVENTION

It is the aim of the present invention to provide a cover laminate such as a roof laminate or cover layer system, the use of same as well as a method for producing a roof cover, in which there is no interaction between the adjoining surfaces, in particular, between the materials of a surface to be covered, such as the surface of a roof, and, for example, a roofing sheet such as a sealing sheet, between which the cover laminate such as a roof laminate or cover layer system extends. In particular, the aim is to prevent plasticizer from migrating into the surface to be covered and/or bitumen from migrating from the surface or from an adhesive layer connecting the cover laminate such as roof laminate or cover layer system, into the cover sheet such as a roofing sheet.

In particular, in order to attain this aim, the following is proposed:

A cover laminate or cover layer system used for covering or sealing an element such as a structure, in particular a roof, comprising at least a first layer, which extends on the element side, in the form of a migration-inhibiting barrier layer or barrier film with respect to bitumen, at least one material from the group consisting of expanded polystyrene, plasticizer, and a second layer, which extends on the side away from the element, in the form of a first nonwoven, wherein the first layer is connected to the second layer either by means of a reactive plasticizer-resistant adhesive, or, in the case of formation of the first layer as a thermoplastic hot-melt adhesive film, by means of said film.

In a development, it is provided that, along the side of the first layer which extends on the element side, such as on the roof side, and connected via an adhesive to said first layer, a third layer extends in the form of a second nonwoven extends.

Here, the adhesive should be a reactive plasticizer-resistant hot-melt adhesive (hot melt). Hot-melt adhesives are known in general to the person skilled in the art and described, for example, in CD Romp Chemie Lexikon, Version 1.0, Georg Thieme Verlag, Stuttgart, 1995.

Moreover, the adhesive can also be a plasticizer-resistant contact adhesive. As binder for this type of adhesive, polymers (particularly polychloroprene and polyurethanes) are used, which, after evaporation of the solvent, transition after a certain time from the amorphous state to the crystalline state, wherein the strength thereof increases considerably.

Moreover, the adhesive can also be a radiation-hardening adhesive. By radical polymerization, these 1-component adhesives harden to form solid polymers, wherein the formation of the starting radicals is induced by irradiation with UV light (or other radiation sources such as electrons). The wavelengths of the UV light emitted by the emitter must be in agreement with the absorption wavelength of the initiator used.

Additional advantageous adhesives can be based on acrylate compounds, polyurethane polymers, silane-terminated polymers, or polyolefins.

Preferred acrylate compounds are, in particular, acrylate compounds based on acrylic monomers, in particular acrylic and methacrylic acid esters.

The term "polyurethane polymers" comprises all the polymers that are produced by the diisocyanate method. This also includes polymers that are nearly or completely free of urethane groups. Polyether-polyurethanes, polyester-polyurethanes, polyether-polyureas, polyureas, polyester-polyureas, polyisocyanurates and polycarbodiimides are mentioned as examples of polyurethane polymers.

Moreover, the adhesives can also be based on thermoplastics and/or thermoplastic elastomers, in particular selected from the group consisting of polyethylene (PE), low-density polyethylene (LDPE), ethylene/vinyl acetate copolymers (EVA), polybutene (PB); olefin-based thermoplastic elastomers (TPE-O, TPO) such as ethylene-propylene-diene/polypropylene copolymers; crosslinked olefin-based thermoplastic elastomers (TPE-V, TPV); thermoplastic polyurethanes (TPE-U, TPU) such as TPU with aromatic hard segments and polyester soft segments (TPU-ARES), polyether soft segments (TPU-ARET), polyester and polyether soft segments (TPU-AREE) or polycarbonate soft segments (TPU-ARCE); thermoplastic copolyesters (TPE-E, TPC) such as TPC with polyester soft segments (TPC-ES), polyether soft segments (TPC-EE); styrene block copolymers (TPE-S, TPS) such as styrene/butadiene block copolymer (TPS-SBS), styrene/isoprene block copolymer (TPS-SIS), styrene/ethylene-butylene/styrene block copolymers (TPS-SEBS), styrene/ethylene-propylene/styrene block copolymers (TPS-SEPS); and thermoplastic copolyamides (TPE-A, TPA).

For the adhesive, an advantageous melting point (determined according to the ring & ball method) is 40-200° C., in particular 70-150° C., preferably 100-120° C. This is particularly advantageous for the production of water-proof membranes and of the barrier layer or barrier film used, which are negatively affected at high production temperatures.

Another subject matter of the invention is a cover laminate or cover layer system, which is used for covering or sealing an element such as a structure, in particular a roof, and which is characterized by a first layer which extends on the element side, in the form of a migration-inhibiting barrier layer with respect to bitumen and/or expanded polystyrene (EPS) and/or plasticizer, as well as a second layer, which extends on the side away from the element, in the form of a first nonwoven, wherein the migration-inhibiting barrier layer or barrier film has the property of being meltable and of having good adhesion properties.

The migration-inhibiting barrier layer has the properties that it is open-pored with respect to steam and partially oxygen, but inhibits the migration of volatile components of plasticizers, such as bitumen or bitumen oil or bitumen components.

In a development, it is provided that, along the side of the first layer which extends on the element side or roof side, a third layer in the form of a second nonwoven extends.

Here, the meltable, migration-inhibiting barrier layer or barrier film, or also referred to as thermoplastic hot-melt adhesive films, should be based on thermoplastics and/or thermoplastic elastomers, selected preferably from one of the group consisting of polyethylene (PE), low-density polyethylene (LDPE), ethylene/vinyl acetate copolymer (EVA), polybutene (PB);

olefin-based thermoplastic elastomers (TPE-O, TPO) such as ethylene-propylene-diene/polypropylene copolymers;

crosslinked olefin-based thermoplastic elastomers (TPE-V, TPV);

thermoplastic polyurethanes (TPE-U, TPU) such as TPU with aromatic hard segments and polyester soft segments (TPU-ARES), polyether soft segments (TPU-ARET), polyester and polyether soft segments (TPU-AREE) or polycarbonate soft segments (TPU-ARCE);

thermoplastic copolyesters (TPE-E, TPC) such as TPC with polyester soft segments (TPC-ES), polyether soft segments (TPC-EE);

styrene block copolymers (TPE-S, TPS) such as styrene/butadiene block copolymer (TPS-SBS), styrene/isoprene block copolymer (TPS-SIS), styrene/ethylene-butylene/styrene block copolymers (TPS-SEBS), styrene/ethylene-propylene/styrene block copolymers (TPS-SEPS);

thermoplastic copolyamides (TPE-A, TPA), in particular thermoplastic copolyamides (TPE-A, TPA), and thermoplastic polyurethanes (TPE-U), TPU).

For a hot-melt adhesive film, an advantageous melting point (determined according to the ring & ball method) is 40-200° C., in particular 70-150° C., preferably 100-140° C. This is particularly advantageous for the production of water-proof sheets and of the barrier layer or barrier film used, which are negatively affected at high production temperatures. In addition, these temperatures represent the optimal conditions for a bonding of the hot-melt adhesive film to the nonwoven.

Here, the barrier layer or barrier film, or also referred to as thermoplastic hot-melt adhesive film, can have a thickness ds such that $5 \text{ μm} \leq ds \leq 100 \text{ μm}$, in particular $15 \text{ μm} \leq ds \leq 50 \text{ μm}$.

The laminate or layer system according to the invention is laid, for example, on a surface of a structure, of a plaza, of a roof. The side that is close to or faces the surface to be covered is referred to as element side.

The first and/or second nonwoven is/are characterized, in particular, in that it/they consist/s of at least one material from the group consisting of cellulose cotton fibers, protein fibers or synthetic fibers. As synthetic fibers, mention is made above all of fibers made of polyester or of a homopolymer or copolymer of ethylene and/or propylene, of a polyamide or rayon, wherein PET (polyethylene terephthalate) and PUR (polyurethane) should be emphasized. The fibers can here be short fibers or long fibers, spun, woven or nonwoven fibers or filaments. Moreover, the fibers can be oriented or stretched. Furthermore, it can be advantageous to use different fibers that differ from one another both in terms of geometry and also composition.

The nonwoven constructed from fibers can be produced by various methods known to the person skilled in the art. Thus, as a rule, first the matrix fibers (made of a solid material) are generated, onto which a layer made of the thermoplastic copolyester is subsequently applied. Such fibers are also familiar to the person skilled in the art under the name of "Biko" (which corresponds to bi-component) fibers.

The nonwoven comprises interstices that can be produced by appropriate production methods. Preferably, interstices are at least partially open and enable the penetration of adhesive.

Moreover, as substitute for a nonwoven, it is also conceivable to use, foams or foamed materials that are based on the roofing sheet base material such as, for example, PVC-P, TPO with polypropylene/EPDM (ethylene-propylene-diene rubber) or polyethylene/EPDM, TPV; it is also possible to use foams based on polyolefins such as, for example, polyethylene and/or polypropylene, based on polyesters such as, for example, polyethylene terephthalate; based on EVA; based on PA.

Moreover, the nonwoven material can also be mixed with superabsorbent polymers or swellable polymers such as, for example, natural swellable polymers from the group consisting of gum arabic, tragacanth and Karaya gum, casein, albumin; semi-synthetic swellable polymers such as, for example, from the group consisting of carboxymethylcellulose, methylcellulose and other cellulose ethers, lignin derivatives, modified starches; synthetic swellable polymers from the group consisting of polymers of acrylic acid/acrylate salts such as polyacrylic acid, polyacrylic acid copolymers, polyacrylamides; bentonites, polyurethanes, polyether block amides, polyacrylic acid esters, ionomers and/or polyamides with appropriate water uptake; polyethylene oxide, polyvinylpyrrolidones, polyethyleneimine, crosslinked sodium polyacrylate, thermoplastic-elastomer composites.

In particular, it is provided that the nonwoven has a thickness $d_v$ such that $0.1 \text{ mm} \leq d_v \leq 5 \text{ mm}$, in particular $0.15 \text{ mm} \leq d_v \leq 0.3 \text{ mm}$, and/or a grammage G of $5 \text{ g/m}^2 \leq G \leq 1000 \text{ g/m}^2$, in particular $20 \text{ g/m}^2 \leq G \leq 50 \text{ g/m}^2$.

Moreover, it should be emphasized that the reactive plasticizer-resistant hot-melt adhesive can be based on PUR (polyurethane), and, in particular, can be a 1-component hot-melt adhesive or multi-component hot-melt adhesive, in particular a 2-component hot-melt adhesive, or the plasticizer-resistant hot-melt adhesive can be a polyolefinic thermoplastic adhesive or adhesive melt, in particular based on polyethylene (PE).

The barrier layer or barrier film is characterized, in particular, in that the barrier layer or barrier film consists of at least one material from the group consisting of PA (polyamide), PET (polyethylene terephthalate), EVOH (ethylene vinyl alcohol copolymer), PP (polypropylene), PE (polyethylene), PVDC (polyvinylidene chloride), PVDF (polyvinylidene fluoride), PAN (polyacrylonitrile), PEN (polyethylene naphthalate), PC (polycarbonate) or at least contains such a material, wherein, in particular, the barrier layer is a hot-melt adhesive based on polyamide (PA).

Particularly preferably, the migration-inhibiting barrier layer consists of a material from the group consisting of polyamide, copolyamide, thermoplastic polyamide (TPA), polyethylene terephthalate (PET) or contains at least one material from this group.

Independently thereof, the barrier layer or barrier film can have a thickness $d_s$ such that $5 \text{ μm} \leq d_s \leq 100 \text{ μm}$, in particular $15 \text{ μm} \leq d_s \leq 50 \text{ μm}$ and/or be designed to be single-layered or multi-layered.

Moreover, the outermost layer or layers of the barrier layer or barrier film can be activated or pretreated using auxiliary methods known to the person skilled in the art, such as, for example, flame treatment, laser pretreatment, ionic etching/sputtering or plasma pretreatment (low-pressure plasma/atmospheric-pressure plasma/corona methods), in order to enable a better adhesion of the adhesive.

A corresponding cover laminate or cover layer system—hereafter referred to simply as roofing sheet laminate—can be attached can be attached onto a surface to be covered such as a roof via a self-adhesive layer based on bitumen, butyl, SPS, SBR (styrene-butadiene rubber), acrylate compounds, silane-terminated polymers or polyolefins or other suitable adhesives having good adhesive properties.

Preferred acrylate compounds are, in particular, acrylate compounds based on acrylic monomers, in particular acrylic and methacrylic acid esters.

Moreover, the adhesives can be based on thermoplastics and/or thermoplastic elastomers, selected in particular from the group consisting of polyethylene (PE), low-density polyethylene (LDPE), ethylene/vinyl acetate copolymers (EVA), polybutene (PB); olefin-based thermoplastic elastomers (TPE-O, TPO) such as ethylene-propylene-diene/polypropylene copolymers; crosslinked olefin-based thermoplastic elastomers (TPE-V, TPV); thermoplastic polyurethanes (TPE-U, TPU) such as TPU with aromatic hard segments and polyester soft segments (TPU-ARES), polyether soft segments (TPU-ARET), polyester and polyether soft segments (TPU-AREE) or polycarbonate soft segments (TPU-ARCE); thermoplastic copolyester (TPE-E, TPC) such as TPC with polyester soft segments (TPC-ES), polyether soft segments (TPC-EE); styrene block copolymers (TPE-S, TPS) such as styrene/butadiene block copolymer (TPS- SBS), styrene/isoprene block copolymer (TPS-SIS), styrene/ethylene-butylene/styrene block copolymers (TPS-SEBS), styrene/ethylene-propylene/styrene block copolymers (TPS-SEPS); and thermoplastic copolyamides (TPE-A, TPA) or combinations thereof.

Moreover, a corresponding cover laminate or cover layer system can be welded by means of a welding composition, particularly based on polymer bitumen, to a surface to be covered, such as a roof, terrace or parking deck.

On the outer first layer it is possible to fasten, for example, a bitumen sheet, an insulation or another possible cover for a structure. In particular, the first layer can be covered by a sealing sheet consisting of at least one material from the group PVC (polyvinyl chloride), TPE (thermoplastic elastomer), TPO (olefin-based thermoplastic elastomer), EPDM (ethylene-propylene-diene rubber), EVA (ethylene vinyl acetate), PP (polypropylene), PE (polyethylene), PA (polyamide).

A method for producing a cover sheet laminate and/or a cover sheet having the above-described features is characterized by the method steps of
    coating of the sides of the first and of the second layer which face one another, and, in the case of the use of the third layer, additional coating of the sides of the first and of the third layer which face one another with the reactive adhesive,
    placing of the layers one on top of the other and curing of the adhesive.
    wherein the first layer is connected to a cover sheet such as a roof sheet, and, for the connection of the cover sheet such as a roof sheet to the cover laminate such as a roof sheet laminate, the latter is warmed or heated, for example, by IR radiation.

In particular, it is provided that, in order to connect the first layer to the second layer or the third layer to the first layer, a reactive plasticizer-resistant hot-melt adhesive is used, which consists of a 1-component or a multi-component reactive hot-melt adhesive.

Other advantageous adhesives can be based on acrylate compounds, polyurethane polymers, silane-terminated polymers or polyolefins.

The cover laminate or cover layer system according to the invention is suitable for every type of roof sheet and seal sheets or sealing sheets such as, for example, PVC, EVA, bitumen, FPO, TPO, TPE, TPV, PIB. The laminate or layer system is suitable for use as a barrier against bitumen. The laminate or layer system can be used as a lining for a self-adhesive roof sheet (sealing sheet), wherein the unit consisting of roofing sheet and laminate or layer system comprises a self-adhesive adhesive layer on the roof side, and thus an unproblematic application and fixation on a surface to be covered is possible. The laminate or layer system can be used as lining for a weldable roofing sheet (sealing sheet), wherein the unit consisting of roofing sheet and cover laminate or cover layer system comprises a welding composition on the roof side, and thus an unproblematic welding and fixation on a surface to be covered is possible.

It is possible to heat the side extending away from the element or roof, that is to say the side onto which, for example, a roofing sheet is applied, by means of IR emitters or other heat sources, so that, during the laying of the corresponding roofing sheets, the roofing sheet composition which is still hot flows into the second layer (nonwoven), with the consequence that, due to the interlocking that occurs as a result, high strengths can be achieved.

With regard to the reactive plasticizer-resistant adhesive, it should be noted that it is characterized in that an interaction with the plasticizers used in the roofing sheets to be applied is excluded. No reaction with bitumen should occur. Reactions with water or moisture should also be prevented.

The cover laminate or cover layer system according to the invention leads to a clear improvement of the aging behavior of a roofing sheet to be applied, since no direct contact occurs between, for example, a roofing sheet and the material of the surface onto which the cover laminate or cover layer system is applied. An interaction is excluded. In addition, plasticizer migration from the sealing sheet or roofing sheet to the surface to be covered is prevented. If the barrier layer or barrier film is no longer capable of fulfilling its function due to aging-caused degradation, then the nonwoven forms another additional safety layer.

The laminate or layer system is connected via a self-adhesive adhesive layer to the surface to be covered, wherein the adhesive layer consists of at least one material from the group consisting of bitumen, butyl, elastomer, SBR, hot-melt adhesive or combinations thereof and a welding composition based on polymer bitumen.

In particular, due to the use of the reactive adhesive, an adhesion is provided between the first and second layer or first and third layer, which rules out a separation of the layers of the laminate even under the great variety of temperatures to be expected outdoors, from −40° C. to +100° C., in particular, from −20° C. to +80° C.

In order to achieve good adhesion between the roofing sheet laminate or roofing sheet layer system and the roofing sheet to be connected to said laminate or layer system, the surfaces that face one another can be pretreated, for example, by corona treatment, flame pretreatment and other known pretreatment methods.

For the production of the cover laminate or cover layer system, a reactive adhesive is applied to the second layer, in order to then apply the first layer, that is to say the barrier layer or barrier film. To the extent that a third layer, that is to say another nonwoven, is present, it is also first coated with the adhesive, in order to then be applied to the barrier layer or barrier film.

A reactive hot-melt adhesive used takes time to cure, without the need for additional application of energy, such as, for example, pressure or heat.

Regarding the PUR (polyurethane)-based reactive plasticizer-resistant adhesive, it should be noted that 1-component and multi-component, in particular 2-component systems can be used, which cure by polyaddition.

1-Component PUR adhesives harden with addition of atmospheric humidity and/or cure.

During the curing, it is possible to use several mechanisms, so that a first handling strength occurs by hardening due to atmospheric humidity, but the final strength of the bonding occurs only with the absorption of heat.

Polyurethane-based adhesives can comprise the following building blocks
    Diphenylmethane-4,4'-diisocyanate (MDI),
    Isophorone diisocyanate (IPDI),
    Toluylene diisocyanate (TDI),
    Hexamethylene diisocyanate (HDI)

Preferably, the laminate cures without additional energy application such as, for example, by heat or pressure, that is to say exclusively over time, wherein a time window of two to three days is easily necessary. Naturally, the invention is not exceeded if additionally pressure and/or heat or another energy application occurs in order to accelerate the curing.

Moreover, the adhesive can also be a plasticizer-resistant contact adhesive, which, after evaporation of the solvent, transitions after a certain time from the amorphous state to the crystalline state, and the strength increases considerably in the process.

Moreover, the adhesive can also be a radiation hardening adhesive, which cures by irradiation with UV light (or other radiation sources such as electrons).

The invention also relates to a method for producing a cover and/or seal of a structure or of a portion thereof, comprising a cover sheet or sealing sheet such as a roofing sheet, consisting in particular of or containing soft PVC as well as a barrier layer extending on the structure side, comprising the method step of applying a polyamide-based hot-melt adhesive forming the barrier layer on the side of a nonwoven extending on the structure side, nonwoven which is to be covered or is covered by the cover sheet.

The possibility exists of applying the hot-melt adhesive by means of a spreading knife, roller application and/or extrusion or as an already pre-fabricated hot-melt film.

Additional details, advantages and features of the invention result not only from the claims, the features that can be obtained therefrom—individually and/or in combination —, but also from the following description of preferred embodiment examples:

DETAILED DESCRIPTION OF THE INVENTION

Figure 1:
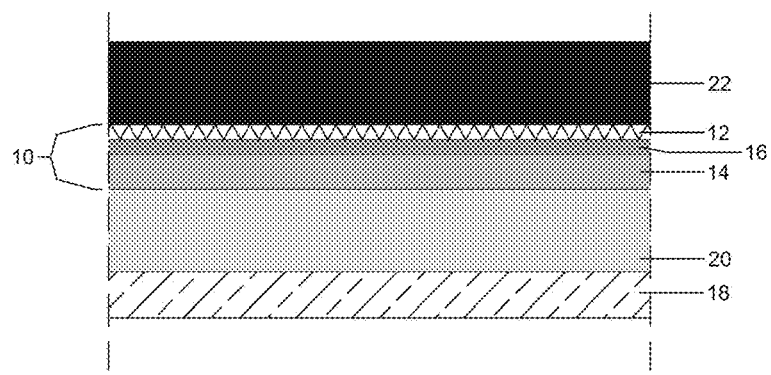
FIG. 1 shows a first embodiment of a roof laminate or roof layer system.

In the figures, in which identical elements are provided with identical reference numerals, one can see cover laminates or cover layer systems, extending between a surface to be covered and a sealing cover sheet or sealing sheet or outside sheet—hereafter referred to as a roofing sheet—in order to prevent a migration of materials from the roofing sheet into the surface and vice versa, to the extent that the aging behavior of the roofing sheet is improved in comparison to the previously known roof layer systems, and the roof layer system is not negatively influenced by materials that tend to migrate.

The migration of bitumen, flux oils and/or plasticizers or of the volatile components thereof and/or expanded polystyrene should be prevented or inhibited. The possibility of diffusion of steam or oxygen should be provided.

Since the main application case is essentially the sealing of structures, in particular the covering of roofs, the expression roofing sheet laminate or roofing sheet layer system is used below, although the term laminate or layer system is also suitable for other coverings. To that extent, the word "roof" is not to be understood in a limiting sense.

However, for the sake of simplicity, the word "roof" is frequently used.

In FIG. 1, a so-called bilaminate 10 is represented, which comprises a nonwoven 12, referred to as second layer, and a barrier film, referred to as first layer 14, which are connected via a reactive plasticizer-resistant adhesive, which is represented in the drawing as layer 16. The first layer 14 can also be a layer system, as explained in reference to FIG. 5.

The second layer 12, —hereafter also referred to as nonwoven 12—is based on polyester or on a homopolymer or copolymer of ethylene and/or propylene, on a polyamide or on rayon, on PET (polyethylene terephthalate) or on PUR (polyurethane), in particular on PET (polyethylene terephthalate). The use of foams can also be considered.

The thickness of the second layer 12 is between 0.1 mm and 5 mm, wherein preferably a thickness between 0.15 mm and 0.3 mm is to be indicated. Possible grammages are between 5 g/m$^2$ and 1000 g/m$^2$, wherein an m$^2$ weight between 20 g/m$^2$ and 50 g/m$^2$ should be given preference.

The first layer 14—hereafter also referred to as barrier film 14—is based, in particular, on PA (polyamide), PET (polyethylene terephthalate), copolyamide, thermoplastic polyamide (TPE-A), EVOH (ethylene vinyl alcohol copolymer), PP (polypropylene), PE (polyethylene), PVDC (polyvinylidene chloride), PVDF (polyvinylidene fluoride), PAN (polyacrylonitrile), PEN (polyethylene naphthalate), PC (polycarbonate) and can be designed to be single-layered or multi-layered. Combinations of the materials mentioned can also be considered.

Particularly preferably, the barrier film 14 consists of or contains at least one material from the group consisting of polyamide, copolyamide, thermoplastic polyamide, polyethylene naphthalate.

Preferred thicknesses of the first layer 14 are between 5 μm and 100 μm, in particular 15 μm and 50 μm.

In particular, the reactive plasticizer-resistant adhesive forming the layer 16 can a hot-melt adhesive based on a 1-component or 2-component system and cures by polyaddition. In the process, 1-component PUR adhesives cure with addition of atmospheric humidity and/or heat. The possibility also exists of combining these mechanisms, so that a first handling strength occurs by hardening due to atmospheric humidity, and the final strength occurs under the influence of heat.

In order to enable the laminate 10 consisting of the layers 12, 14, 16 to be laid on a boundary surface such as a roof 18, along the outer side of the barrier film 14, a self-adhesive adhesive layer 20 extends, which can be based, for example, on bitumen, butyl, SBR (styrene-butadiene elastomer), elastomers or combinations thereof or on a welding composition based on polymer bitumen. Other suitable adhesive layers can also be considered.

On the outer side, the roof 18 can comprise a bitumen sheet, an insulation, in particular EPS, or other roof superstructures from the roofing sector. This is subsumed under the term roof.

The outer side of the bilaminate 10 and thus of the nonwoven 12 is covered by a roofing sheet 22 which, in particular, is based on materials such as PVC (polyvinyl chloride), TPE (thermoplastic elastomer), TPO (olefin-based thermoplastic elastomer), TPV (thermoplastic vulcanizate), EPDM (ethylene-propylene-diene rubber), EVA (ethylene vinyl acetate), wherein, as roofing sheet 22, all those classified in DIN SPEC2000-21 can be considered.

As roofing sheet 22, one can also consider using film types such as PP (polypropylene), PE (polyethylene), PA (polyamide), PIB (polyisobutylene), PET (polyethylene terephthalate).

For the production of the bilaminate 10, the nonwoven 12 is first coated with the reactive plasticizer-resistant hot-melt adhesive. This can occur by application by means of rollers. The barrier film 14 is then applied onto the layer 16 formed by the hot-melt adhesive. In order to cure the hot-melt adhesive and thus for the establishment of the connection between the nonwoven 12 and the barrier film 14, an additional energy application is in principle not necessary. Instead, curing can take place over a period of two to three days, for example. However, a targeted energy application can of course be carried out in order to shorten the duration.

An appropriate laminate 10 is connected to the roof 18 via the self-adhesive adhesive layer 20. The roofing sheet 12 can then be applied onto the nonwoven 12. For this purpose, it is provided, in particular, that the bilaminate 10 is first heated—for example, by IR emitter —, so that roofing sheet composition can flow from the preheated roofing sheet 12 into the nonwoven 12, resulting in high strength due to interlocking between roofing sheet 22 and nonwoven 12.

Figure 2:
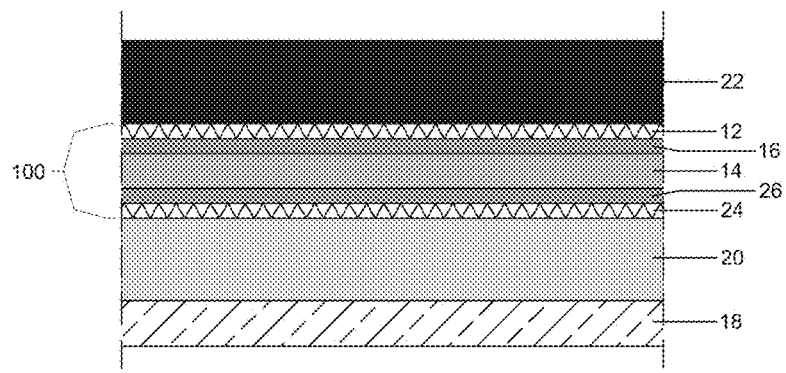
FIG. 2 shows a second embodiment of a roof laminate or roof layer system.

The laminate 100, which can be seen in FIG. 2, is a trilaminate and, in addition to the first layer 14, the second layer 12 and the reactive hot-melt adhesive, extending between these layers and referred to as layer 16, it comprises a third layer 24, which extends opposite from the second layer 12 and which is also a nonwoven. The third layer 24 is also connected via a reactive plasticizer-resistant hot-melt adhesive, represented as layer 26, to the barrier film 14, so that reference is made to explanations provided above/. The trilaminate 100 which has been constructed in this manner is connected, in accordance with the bilaminate 20, on the one hand, to the roof 18 via the self-adhesive adhesive layer 20, and, on the other hand, to the roofing sheet 22 in the above-described manner.

Figure 3:
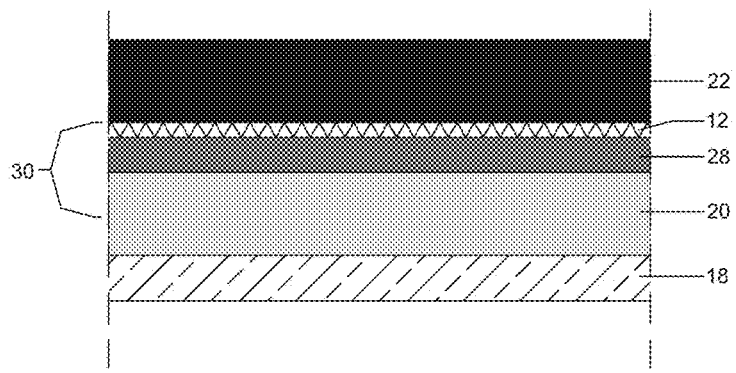
FIG. 3 shows a third embodiment of a roof laminate or roof layer system.
Figure 4:
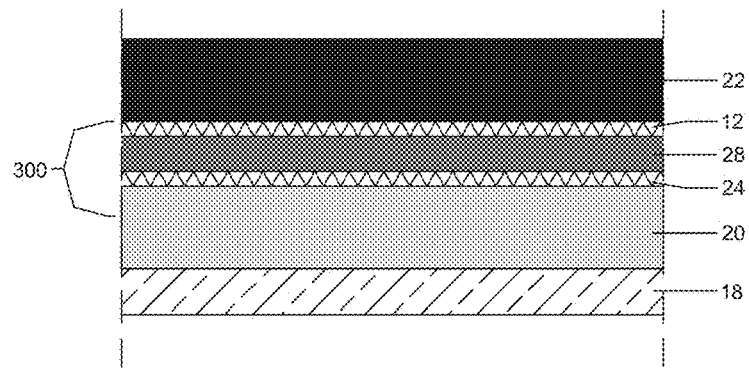
FIG. 4 shows a fourth embodiment of a roof laminate or roof layer system.

In FIGS. 3 and 4, additional embodiments of a laminate or layer system can be seen, by means of which a migration of materials from one side to the other side or vice versa is to be prevented or inhibited or reduced. The laminates 30, 300 shown in FIGS. 3 and 4 differ from those of FIGS. 1 and 2 in that the nonwoven 12 (FIG. 3) or the nonwovens 12, 24 (FIG. 4) are not connected with a reactive plasticizer-resistant adhesive, but, instead, a barrier film 28 marked by the reference numeral 28 and connected to the nonwoven 12 or to the nonwovens 12, 24 at the same time has adhesive properties, that is to say, at the same time forms the adhesive component. For this purpose, the barrier film 28 is designed, in particular, as a thermoplastic hot-melt adhesive film. The barrier film 28 is connected directly to the nonwovens 12, 24 and not via an adhesive layer to said nonwovens.

Here, the meltable, migration-inhibiting barrier film 28—also referred to as thermoplastic hot-melt adhesive films—should be based on thermoplastics and/or thermoplastic elastomers, preferably selected from one of the groups consisting of polyethylene (PE), low-density polyethylene (LDPE), ethylene vinyl acetate copolymer (EVA), polybutene (PB)

olefin-based thermoplastic elastomers (TPE-O, TPO) such as ethylene-propylene-diene/polypropylene copolymers crosslinked olefin-based thermoplastic elastomers (TPE-V, TPV)

thermoplastic polyurethanes (TPE-U, TPU) such as TPU with aromatic hard segments and polyester soft segments (TPU-ARES), polyether soft segments (TPU-ARET), polyester and polyether soft segments (TPU-AREE) or polycarbonate soft segments (TPU-ARCE)

thermoplastic copolyesters (TPE-E, TPC) such as TPC with polyester soft segments (TPC-ES), polyether soft segments (TPC-EE)

styrene block copolymers (TPE-S, TPS) such as styrene/butadiene block copolymer (TPS-SBS), styrene/isoprene block copolymer (TPS-SIS), styrene/ethylene-butylene/styrene block copolymers (TPS-SEBS), styrene/ethylene-propylene/styrene block copolymers (TPS-SEPS)

thermoplastic copolyamides (TPE-A, TPA), in particular thermoplastic copolyamides (TPE-A, TPA), and thermoplastic polyurethanes (TPE-U, TPU).

Here, the barrier layer or barrier film 28 can have a thickness ds such that 5 µm≤ds≤100 µm, in particular 10 µm≤ds≤50 µm.

For the production of the bilaminate 30, the nonwoven 12 and the thermoplastic barrier film 28 are first heated, for example, by IR emitters or heated rollers. In an additional step, the nonwoven 12 and the barrier film 28 is compressed under pressure and cooled. For this purpose, for example, a calendar stack with cooled rollers can be used. Already at temperatures barely below the melting point of the barrier film 28, but, at the latest, when room temperature is reached, the composite has solidified and can be rolled up and packaged.

In the production of the trilaminate 300, only the nonwoven 24 and the facing side of the barrier film 28 are heated and subjected to the same method as already described.

Therefore, the invention is characterized by a method for producing a cover laminate or a roof covering, having the method steps of:

heating of the side of the barrier film 28 (FIG. 3) which faces the nonwoven 12 and, in the case of use of an additional nonwoven 24, additional heating of the side of the barrier film 28 which faces the nonwoven 24 (FIG. 4), placement of the layers (nonwovens 12, 24, barrier film 28) one on top of the other and connecting of the individual layers by pressure, wherein the nonwoven 12 is then connected to a roofing sheet 22, in that at least the laminate 30, 300 is heated, for example, by IR emitters or heated rollers, and is then applied to the roofing sheet 22. p In order to facilitate the processing during the production of the bilaminate 30 and also of the trilaminate 300, it is possible in various cases to use a carrier film, for example based on PE (polyethylene) and/or PP (polypropylene), which, in the end, or after the respective production step, can be pulled off.

The bilaminate 10 and 30 and also the trilaminate 100 and 300 can be used as lining for a self-adhesive roofing sheet, so that a unit consisting of roofing sheet 22, bilaminate 10 or 30 or trilaminate 100 or 300 with the self-adhesive adhesive layer 20 extending on the outside is available and can be used.

However, the invention is characterized in particular in that, as adhesive, by means of which the nonwoven 12 or the nonwovens 12, 24 are connected to the barrier layer 14, instead of a hot-melt adhesive consisting of PUR, a polyolefinic thermoplastic adhesive or a corresponding adhesive melt is used, wherein the latter is based in particular on polyethylene. An advantage of the use of a corresponding adhesive consists in that a good hydrolysis resistance is provided.

However, the invention is also characterized in that, as blocking or barrier layer, a layer based on polyamide is used, wherein a corresponding polyamide melt can be applied directly to the nonwoven 12 or 24, so that an additional adhesive would not be required. The application on the nonwoven 12, 24 can occur by spreading knife and/or roller application and/or by extrusion or coextrusion and/or injection molding.

When the term barrier layer or barrier film or migration-inhibiting layer is used above, it must be pointed out that this layer itself can consist of a layer system, which is to be referred to as barrier layer or barrier film or migration-inhibiting layer or film. The layer system, which is labeled 14 according to FIGS. 1 and 2, here consists of a central layer 114, which performs the migration-inhibiting action and which consists, in particular, of a material from the group consisting of polyamide, copolyamide, thermoplastic polyamide (TPE-A), polyethylene naphthalate (PET) or contains said material. The layer 114 is covered on both sides by an adhesion promoter layer or an adhesive 116, 118. On the adhesive or adhesion promoter layer 116, 118, a respective covering layer 120, 122 is then applied, which should consist of a polyolefin, wherein, in particular, as material, one should mention a material from the group consisting of PP (polypropylene), PE (polyethylene), LDPE (low-density polyethylene) or HDPE (high-density polyethylene). This layer system, which forms the first layer 14, and which is also referred to as barrier film, is then connected by means of the reactive plasticizer-resistant adhesive 16 to the nonwoven 12 or via the self-adhesive adhesive layer 20 to a substrate.

Figure 5:
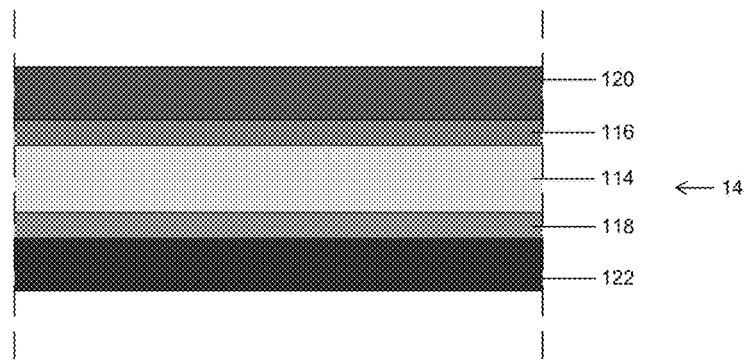

As has been explained in reference to FIGS. 1 to 4, in view of FIG. 5, the bilaminate or trilaminate is used particularly in connection with roofing sheets, wherein the nonwoven 12 is interlocked with a corresponding roofing sheet bearing reference numeral 22 in the figures, in order to establish a reliable connection.

For covering or sealing large surfaces, corresponding cover units or roofing sheet units have to be laid next to one another. In order to seal said units with respect to one another, two different possibilities exist, which can be seen in FIGS. 6 to 8.

Figure 6:
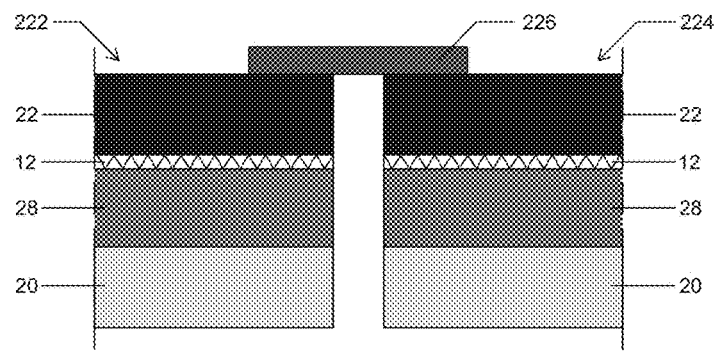

In FIG. 6, corresponding roofing sheet units marked with reference numerals 222 and 224 are arranged next to one another. The adjoining edges are covered by a strip 226, which is then welded to the roofing sheets 22. The strips 226 should be made of the same material as the roofing sheet 22.

Figure 7:
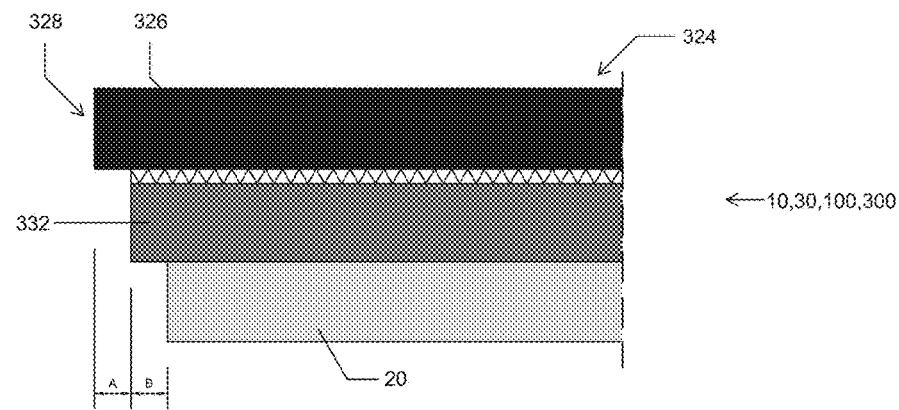
Figure 8:
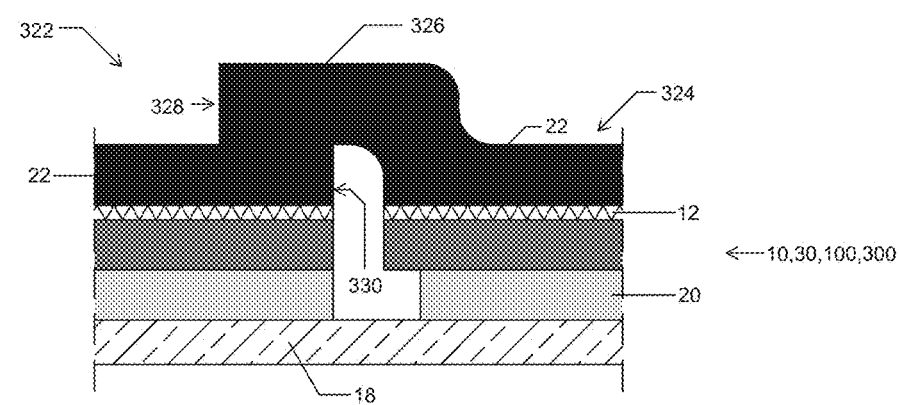

In FIGS. 7 and 8, an embodiment to be emphasized particularly can be seen, the aim being to weld the roofing sheet units 322, 324 to one another. As can be seen in FIG. 8, one of the roofing sheet units, namely the roofing sheet unit 324, comprises a welding edge 326, which is the edge section of the right roofing sheet 22. Thus, the bilaminate or trilaminate 10, 30, 100, 300 extends offset relative to the outer edge 328 of the roofing sheet 22, and the underside of the welding edge 326 is thus exposed. The welding edge 326 is placed on the edge of the roofing sheet 22 of the adjacent roofing sheet unit 322 and then welded to the roofing sheet 22. In this edge area, the bilaminate or trilaminate 10, 30, 100, 300 can extend flush with respect to the outer edge 330 of the roofing sheet 22. A gap of, for example, between 0.5 cm and 2 cm can of course also exist between the bilaminate edge or the trilaminate edge and edge 330 of the roofing sheet 22.

The gap A between the bilaminate or trilaminate 10, 30, 100, 300 and the outer edge 328 of the welding edge 326 should be in the range of between 5 cm and 6 cm. Offset back relative to the outer edge 332 of the bilaminate or trilaminate 10, 30, 100, 300, the self-adhesive layer 20 should then extend. The gap B is preferably in the range of between 1 cm and 2 cm.

Although the invention has been explained in a preferential manner in reference to a roof to be covered, the teaching according to the invention is not limited thereby. Instead, the teaching applies to all the application cases in which surfaces are to be covered, that is to say, in particular, any building surfaces, open air surfaces to be sealed or pool surfaces.

The invention claimed is:

1. A laminated article for covering a structure, comprising:
   (i) a barrier layer including:
      a central layer of a thermoplastic hot-melt adhesive film, the central layer having a first surface and a second surface;
      a first layer of an adhesive or an adhesion promoter disposed on the first surface of the central layer;
      a second layer of an adhesive or an adhesion promoter disposed on the second surface of the central layer;
      a first layer of a polyolefin disposed on the first layer of the adhesive or the adhesion promoter; and
      a second layer of a polyolefin disposed on the second layer of the adhesive or the adhesion promoter; and,
   (ii) a first layer of a non-woven material connected to the first layer of the polyolefin by a first reactive plasticizer-resistant adhesive.

2. The laminated article according to claim 1, further comprising a second layer of a non-woven material connected to the second layer of the polyolefin.

3. The laminated article according to claim 2, wherein the second layer of the non-woven material is connected to the second layer of the polyolefin by the reactive plasticizer-resistant adhesive.

4. The laminated article according to claim 1, wherein the reactive plasticizer-resistant adhesive is a reactive plasticizer-resistant hot-melt adhesive.

5. The laminated article according to claim 1, wherein the first layer of the non-woven material comprises a material selected from the group consisting of a polyester; at least one of a homopolymer or copolymer of ethylene, and a homoplymer or copolymer of propylene; a polyamide; viscose; a polyethylene terephthalate; and a polyurethane.

6. The laminated article according to claim 1, wherein the first layer of the non-woven material has a thickness $d_v$, wherein $0.1 \text{ mm} \leq d_v \leq 5 \text{ mm}$, and/or a grammage G, wherein $5 \text{ g/m}^2 \leq G \leq 1000 \text{ g/m}^2$.

7. The laminated article according to claim 1, wherein the reactive plasticizer-resistant adhesive comprises a polyurethane and is one-component hot-melt adhesive, or a multi-component hot-melt adhesive, or the reactive plasticizer-resistant adhesive is a polyolefinic thermoplastic adhesive or adhesive melt.

8. The laminated article according to claim 1,
   wherein the central layer comprises a material selected from the group consisting of a polyamide, a copolyamide, a thermoplastic polyamide, a polyethylene terephthalate, an ethylene vinyl alcohol copolymer, a polypropylene, a polyethylene, a polyvinylidene chloride, a polyvinylidene fluoride, a polyacrylonitrile, a polyethylene naphthalate, a polycarbonate, a thermoplastic, and a thermoplastic elastomer.

9. The laminated article according to claim 1, wherein the barrier layer has a thickness ds, wherein $5 \text{ μm} \leq ds \leq 100 \text{ μm}$.

10. The laminated article according to claim 1, wherein the first layer of the non-woven material is mixed with a superabsorbent polymer or a swellable polymer.

11. The laminated article according to claim 2, wherein at least one of the first layer of the non-woven material and the second layer of the non-woven material comprises a material selected from the group consisting of a polyester; at least one of a homopolymer or copolymer of ethylene, and a homoplymer or copolymer of propylene; a polyamide; viscose; a polyethylene terephthalate; and a polyurethane.

12. The laminated article according to claim 2, wherein at least one of the first layer of the non-woven material and the second layer of the non-woven material has a thickness $d_v$, wherein 0.1 mm≤$d_v$≤5 mm, and/or a grammage G, wherein 5 g/m²≤G≤1000 g/m².

13. The laminated article according to claim 8, wherein the thermoplastic and the thermoplastic elastomer are selected from the group consisting of:
  polyethylene, low-density polyethylene, ethylene/vinyl acetate copolymer, polybutene;
  olefin-based thermoplastic elastomers, ethylene-propylene-diene/polypropylene copolymers;
  crosslinked olefin-based thermoplastic elastomers;
  thermoplastic polyurethanes, thermoplastic polyurethanes with aromatic hard segments and polyester soft segments, polyether soft segments, polyester and polyether soft segments or polycarbonate soft segments;
  thermoplastic copolyesters, thermoplastic copolyesters with polyester soft segments, polyether soft segments;
  styrene block copolymers, styrene/butadiene block copolymers, styrene/isoprene block copolymers, styrene/ethylene-butylene/styrene block copolymers, styrene/ethylene-propylene/styrene block copolymers; and
  thermoplastic copolyamides, thermoplastic copolyamides, and thermoplastic polyurethanes.

14. The laminated article according to claim 1, wherein the central layer comprises a member selected from the group consisting of a polyamide, a copolyamide, a thermoplastic polyamide, and a polyethylene terephthalate.

15. The laminated article according to claim 1, wherein the central layer is a hot-melt adhesive based on a polyamide.

16. The laminated article according to claim 1, wherein the central layer consists of a polyamide, a copolyamide, a thermoplastic polyamide, or a polyethylene terephthalate.

17. The laminated article according to claim 1, further comprising a roofing sheet connected to the first layer of the non-woven material.

18. The combination according to claim 17, wherein the roofing sheet comprises a material selected from the group consisting of a polyvinyl chloride, a thermoplastic elastomer, an olefin-based thermoplastic elastomer, a thermoplastic vulcanizate, an ethylene propylene diene rubber, an ethylene vinyl acetate, a polypropylene, a polyethylene, a polyamide, and mixtures thereof.

\* \* \* \* \*